United States Patent [19]

Iqbal

[11] Patent Number: 4,973,025
[45] Date of Patent: Nov. 27, 1990

[54] METERING VALVE

[75] Inventor: Muhammad Iqbal, Sheboygan, Wis.

[73] Assignee: Kohler Co., Kohler, Wis.

[21] Appl. No.: 457,016

[22] Filed: Dec. 26, 1989

[51] Int. Cl.$^5$ .............................................. F16K 21/06
[52] U.S. Cl. ........................................ 251/48; 188/301
[58] Field of Search .................. 188/301; 251/48, 51, 251/52, 54, 55; 16/51, 66, 82, 84

[56] References Cited

U.S. PATENT DOCUMENTS

| | | | |
|---|---|---|---|
| 392,741 | 11/1888 | McHugh . | |
| 531,484 | 12/1894 | Turner | 251/48 |
| 557,292 | 3/1896 | Turner . | |
| 690,011 | 12/1901 | Blake . | |
| 912,022 | 2/1909 | O'Brien | 251/48 |
| 1,461,163 | 7/1923 | Robinson | 251/55 |
| 1,513,830 | 11/1924 | La Casse | 251/55 |
| 1,537,440 | 5/1925 | Gymnaitis | 251/55 |
| 1,558,590 | 10/1925 | Carlson | 251/55 |
| 1,857,363 | 5/1932 | Dencklau | 251/55 |
| 1,995,792 | 3/1935 | Brown | 251/52 |
| 2,788,064 | 4/1957 | Van De Walker | 251/48 |
| 3,065,948 | 11/1962 | Nolan | 251/52 |
| 3,376,013 | 4/1968 | Mallett | 251/55 |
| 3,933,337 | 1/1976 | Morris et al. | 251/54 |
| 4,821,765 | 4/1989 | Iqbal et al. | 137/270 |

*Primary Examiner*—George L. Walton
*Attorney, Agent, or Firm*—Quarles & Brady

[57] ABSTRACT

A delayed closing metering type valve is provided which has a bleed control and entry device utilizing a single air passage and a minimum number of parts. In one embodiment, the air passage is generally T-shaped and a metering pin with a conical portion fits into a straight wall portion of an air passage. In another embodiment, an elongated screw member is positioned against a flexible ring member having a passage therein for compressibly increasing or decreasing the air passage in the flexible ring member. The metering valve is fabricated in a manner so as to be easily attached in a faucet housing or removed therefrom as a cartridge unit.

13 Claims, 2 Drawing Sheets

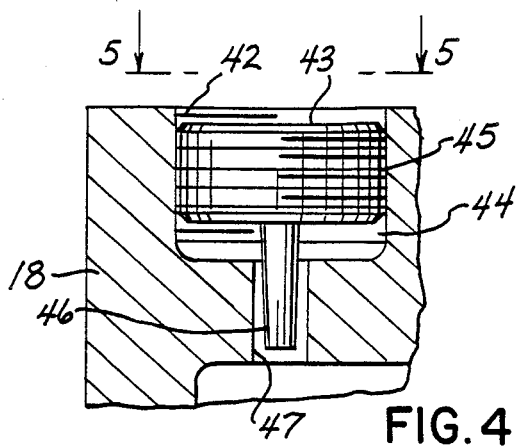
FIG. 4
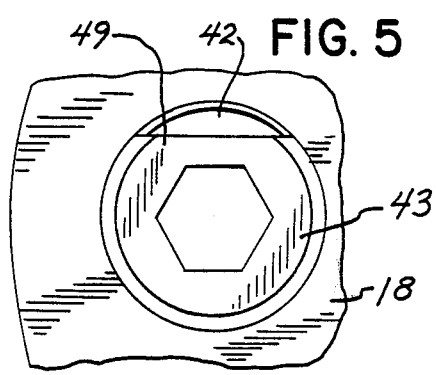
FIG. 5
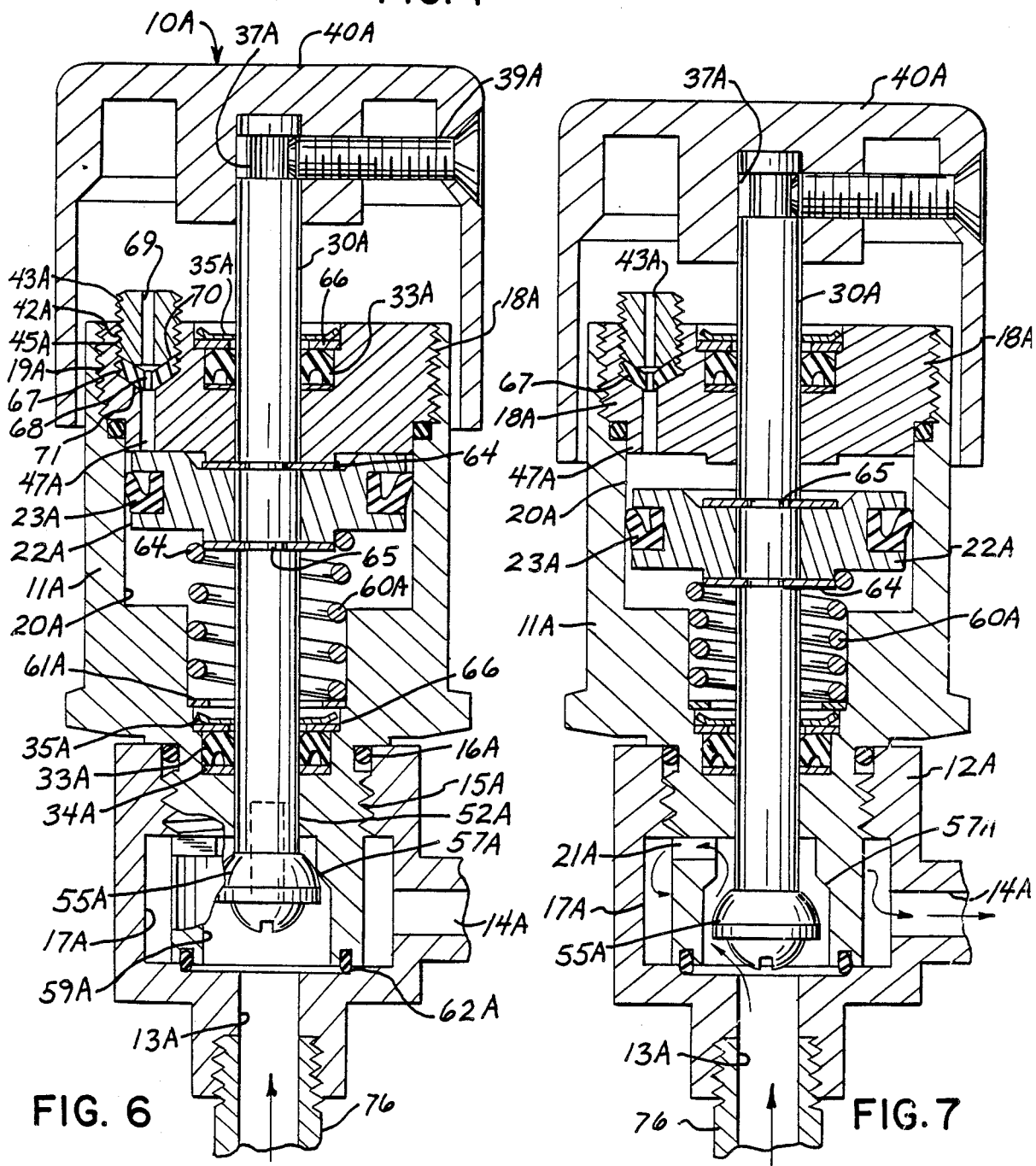
FIG. 6
FIG. 7

METERING VALVE

BACKGROUND OF THE INVENTION

A. Field Of The Invention

This invention relates primarily to delayed self closing valves which are primarily used in conjunction with a faucet housing. More particularly it relates to valves that use a controlled bleed of air to permit a spring to close the valve.

B. Description Of The Art

Metering valves for faucets are well known. See e.g. U.S. Pat. Nos. 557,292, 1,513,830, 1,857,363, 3,376,013 and 3,933,337. Unfortunately, the prior art metering valves typically employ multiple passageways (or valving systems which employ two or more different components such as a needle valve in combination with an air valve) to control air intake and release. This unnecessarily increases the cost of manufacture and repair of the valve. Thus, it can be seen that a need exists for a simplified air valving system for a metering type valve.

Also a need exists for a metering valve which is of a cartridge type so as to be easily connected or disconnected from a faucet housing as well as a faucet metering valve which itself can be easily assembled or disassembled.

SUMMARY OF THE INVENTION

In one aspect, the invention provides a self closing type valve for use in a valve housing with the housing having an inlet and an outlet. The self closing valve has a valve body portion having an axial bore. There is an entrance opening for fluid communication between the housing inlet and the axial bore and an exit opening for fluid communication between the axial bore and outlet. A stem is movable in the axial bore, and there are means operatively associated with one end of the stem and the valve body opening to effect a closing of the entrance opening. A dashpot piston portion has a cylinder head and a piston in the cylinder head with the stem connected to the piston. The dashpot piston portion includes a bleed cavity on one side of the piston with an air passage providing communication into the cavity from outside the cavity. The cylinder head is configured to provide substantially no other communication with the outside except the air passage.

In one preferred form there is an air metering pin positioned in the air passage to selectively control the rate of air bleeding into the cavity while permitting air to also pass out of the cavity through the bleed cavity when the valve is being closed. One of the metering pin and the air passage has a conically shaped portion and the other a cylindrical wall portion. A handle is connected to the stem at an end opposite the entrance opening. A biasing means is provided to bias the piston in a direction toward the handle. The valve is operated by a force effected on the handle in the direction of the entrance opening which causes the valve to open and air to be drawn into the bleed cavity. A subsequent release of force on the handle allows the biasing means to effect a force on the piston and a restricted flow of air outwardly through the air passage with a delay closing of the valve resulting.

In another preferred from, there is a resilient seal member and a screw with an air bore extending therethrough positioned in the air passage in place of the air metering pin.

In yet another aspect, the self closing valve is of a compact cartridge type with all of the previously indicated components contained within a valve body portion which is adapted for attachment to a faucet housing.

The objects of the invention therefore include:

a. providing a valve of the above kind which has a simplified air regulating means;

b. providing a valve of the above kind which can be manufactured with few parts and thus at reduced costs; and c. providing a valve of the above kind which lends itself to a compact cartridge design for ease of handling, installation and repair.

These and still other objects and advantages of the invention will be apparent from the description which follows. In the detailed description below, the preferred embodiments of the invention will be described with reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 4 is an enlarged view in partial cross section illustrating the air metering pin employed in the embodiment shown in FIGS. 1-3;

FIG. 5 is a top plan view taken along line 5—5 of FIG. 4;

FIG. 6 is a sectional view analogous to FIG. 2 except showing an alternative embodiment; and FIG. 7 is a view similar to FIG. 6 except showing the metering valve of FIG. 6 in the open position.

DESCRIPTION OF THE PREFERRED EMBODIMENTS

Figure 1:
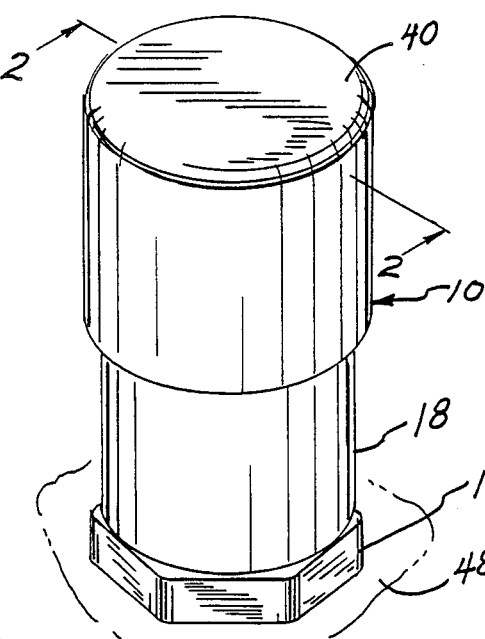
FIG. 1 is top perspective view showing the metering valve mounted on a faucet housing.
Figure 2:
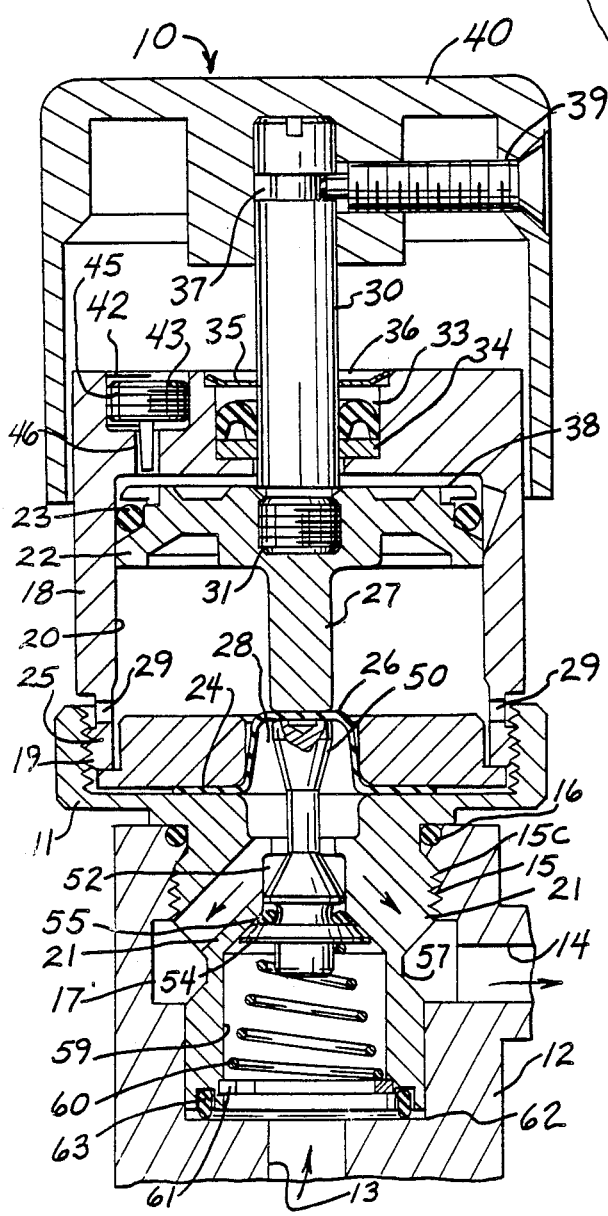
FIG. 2 is an enlarged view in vertical cross section taken on line 2—2 of FIG. 1 with the valve in the closed position.
Figure 3:
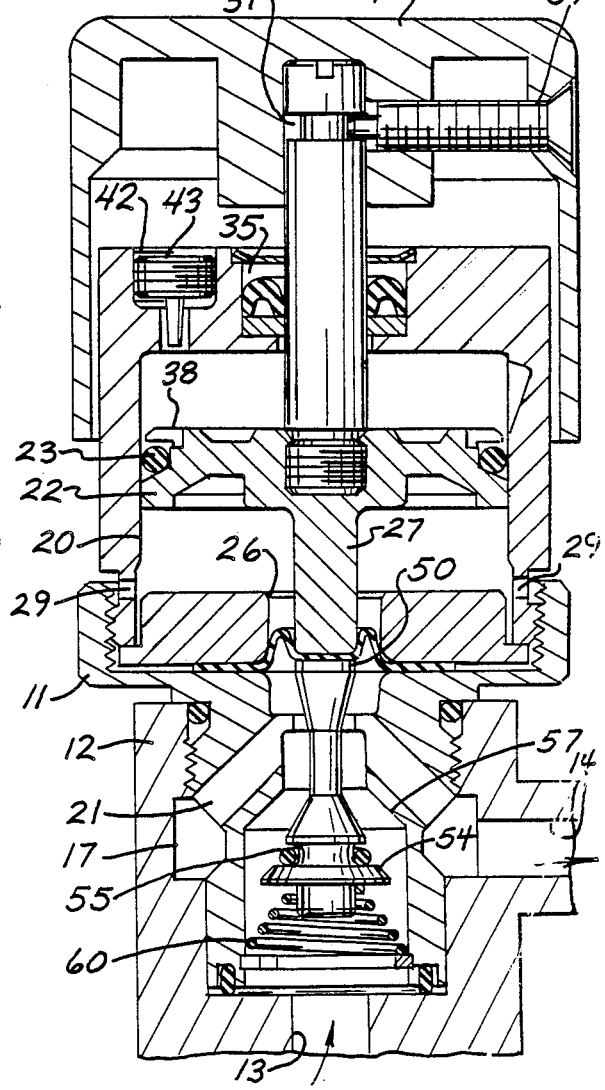
FIG. 3 is a view similar to FIG. 2 showing the metering valve in the open position.

Referring first to FIGS. 1-3, the metering valve assembly generally 10 is shown in conjunction with a faucet housing 12. The housing has the usual bottom water inlet 13, side or other water outlet 14, and valve cartridge receiving cavity 17. The direction arrows in FIG. 3 illustrate the pathway of water through the metering valve from the inlet 13 up through the valve to side openings 21 and out into cavity 17 between the valve end and the faucet housing 12. The water will then be directed out of the faucet housing through the outlet 14.

As best seen in FIG. 2, a brass, unitary valve body 11 has outer threads 15 for engagement with inner threads 15C of the faucet housing 12. The valve body 11 is also threaded to the upper housing 18 by the threads 19. The upper housing 18 has a compartment 20 for slideably receiving the dashpot piston 22 with the seal 23 resiliently retained thereon. Disposed and retained between valve body 11 and upper housing 18 is a diaphragm plate 25 having a central passage 28 for accommodating a flexible portion of the diaphragm 26. Extending from one end of the piston 22 is a projection 27 for contact with the diaphragm 26 and for downward movement of the inlet pin 50. Another portion of the diaphragm is indicated by the numeral 24 and is trapped between the diaphragm plate 25 and the valve body 11.

The piston 22 is connected to upper valve stem 30 by the threads 31, which in turn is innerconnected to push knob 40 by means of the laterally disposed set screw 39 engaging the stem groove 37. The valve stem 30 is slideably and sealably disposed through the upper housing 18 by a cup washer 33 retained in the compartment 36 by the flat washer 34 and the frictional retaining ring 35.

Most importantly, positioned in the upper housing 18 is a T-shaped air passage 42 and an air metering pin 43. As best seen in FIG. 4 and 5, the metering pin 43 is adjustably positioned in the passage 42 by the threads 45.

The air passage 42 includes a large diameter passage 44 and a smaller diameter straight wall passage 47 in which is disposed the conical stem 46 of the metering pin 43.

Referring specifically to FIG. 5, it is seen that there is a cutaway portion 49 of the metering pin 43 so as to allow air flow into and out of the air passageway 42.

Turning again to FIG. 2, the valve body 11 also has a central bore 52 of varying internal diameters to accommodate the inlet pin 50. A flange 54 extends from the pin 50 to resiliently accommodate the seal 55 for positioning against a valve seat 57. A compartment 59 is provided in the valve body to position a coil spring 60 which is retained therein by a retaining ring 61. A gasket 62 is housed in a groove 63 for sealing the valve body 11 in the faucet housing 12.

Referring to the alternative embodiment generally 10a shown in FIGS. 6 and 7, the same or similar components are designated with the same reference numerals except followed by the letter "A". One of the major differences between the two embodiments is in the different type of a metering device. In the embodiment 10A, the metering device 43A is in the form of an elongated screw 43A having the threads 45A for threadable engagement in the T-shaped air passage 42A. Disposed beneath the metering screw 43A is a flexible ring member 67 which has a "V" shape in cross section and also has an air passage 68 for communication with the air passage 69 in the metering screw 43A. The metering screw 43A has a conical tip 70 for pressing the ring member 67 against the conical wall 71 to effect an opening or closing of the air passage 68.

Another difference between embodiment 10 and 10A is in the fastening of the stem 30A to the piston 22A. It is seen that this is effected by the retaining rings 64 on opposite sides of the piston 22A and locked in the grooves 65.

Further, this embodiment 10A has the spring 60A positioned inside the valve body 11A and includes the additional cup washer 33A housed in the valve body 11A as well as the additional washers 66 utilized in conjunction with both cup washers 33A.

OPERATION

FIG. 2 shows the valve in its closed position where seal 55 is forced against the valve seat 57 by the spring 60. Inlet water pressure also acts against the flange 54 to assist in holding the valve closed.

In order to open the valve 10, a push is exerted on the push knob 40. This action moves the piston 22 downwardly in the chamber 20 toward housing 48 and also will forces air out of the side vent holes 29. At the same time, a reduction in pressure is effected at the trailing end 38 of the piston 22. Air is therefore automatically drawn into the compartment 20 above the piston through the T-shaped air passage 42 by passing through the cutaway portion 49 of the metering pin 43 and the conical stem 46 in the passage 47.

The overall result is the opening of the metering valve 10 by piston projection 27 forcing inlet pin 50 downwardly to allow the water to enter from the inlet 13, around the seal 55, through the side openings 21, into the receiving cavity 17 and out through the outlet 14. Compare FIG. 3.

Upon release of the push knob 40, the spring 60 will try to push the piston 22 up through the engagement of the inlet pin 50. Also the force of incoming water acts against the diaphragm 26 to try to push the piston in the direction of the metering pin 43 and to its original position shown in FIG. 2. However, as the piston moves in this direction, air becomes trapped above the piston 22 and the trapped high pressure air resists (and thus delays) the closing movement. The only place air can escape is through the T-shaped air passage 42. The rate of escape of the air can be adjusted by fixing member 43 either farther up or farther down in the recess. The greatest width of stem 46 in passage 47 determines how long the seal 55 remains away from the valve seat 57 which determines the delay in closing.

The operation of the air control in FIGS. 6 and 7 is essentially the same as that indicated previously for embodiment 10. The main difference is in the way the air is metered out of compartment 20A and through the metering screw 43A. This metering action is adjusted by turning the metering screw 43A against the ring member 67 to either increase or decrease the size of the air passage 68. It will be readily seen and due to the conical configuration of the tip 70, the more force that is exerted onto the resilient ring member 67, the smaller will become the air passage 68. Conversely the less force the greater the opening. The size of the air passage 68 will determine how fast the piston 22A moves to the position shown in FIG. 6 which is the closed position of the valve.

It should be noted that valve body 11A has no outlet openings for the escape of air when the piston 22A moves downwardly. This is provided by the U-shaped seal 23A which allows air to escape upwardly as the piston 22A moves downwardly but acts as a check valve when the piston moves upwardly.

An important feature of both embodiments 10 and 10A is in the simplicity of the air metering. Note that in the instance of embodiment 10, all that is required for metering the air is a single T-shaped air passage 42 which also houses the metering pin 43 with a conical stem 46, disposed in passage 47. Accordingly, there is only one passage and one moving part. In the instance of embodiment 10A, there are only two component parts, namely the metering screw 43A and the resilient ring member 67, and only one passage. In each embodiment 10 and 10A, there are straight through air passages which do not easily become clogged, and in the instance where this might happen, any foreign material can be easily removed as there are no lateral branches. Embodiments 10 and 10A can be easily assembled and disassembled.

Thus, the invention provides an improved metering valve. While the preferred embodiment has been described above, it is readily apparent to those skilled in the art that a number of modifications and changes may be made without departing from the spirit or scope of the invention. For example, while a faucet has been shown, the valve can be used with other types of fluid valves. Also, the specific materials mentioned are not the only materials that can be used. All such and other modifications within the spirit of the invention are meant to be in the scope thereof.

I claim:

1. A self closing type valve for use in a valve housing, the housing having an inlet and an outlet, the self closing type valve comprising:
   a valve body portion having an axial bore, an entrance opening for fluid communication between the housing inlet and the axial bore, and an exit opening for fluid communication between the axial bore and outlet;
   a stem movable in the axial bore;
   means operatively associated with one end of the stem and the valve body opening to effect a closing of the entrance opening;
   a dashpot piston portion having a cylinder head and a piston in the cylinder head with the stem connected to the piston;
   the dashpot piston portion including a bleed cavity on one side of the piston with a single air passage providing communication into the cavity from outside the cavity, the cylinder head being configured to provide substantially no other communication with the outside except said single air passage;
   an air metering pin being adjustably positioned in the single air passage to simultaneously and selectively control the rate of air bleeding into the cavity while permitting air to also pass out of the cavity and through the air passage when the valve is being closed, one of the metering pin and the single air passage having a conically shaped portion and the other a cylindrical wall portion;
   a handle connected to the stem at an end opposite the entrance opening; and
   biasing means to bias the piston in a direction toward the handle;
   whereby a force effected on the handle in the direction of the entrance opening will cause the valve to open and air to be drawn into the bleed cavity from the air passage and a subsequent release of force on the handle will allow the biasing means to effect a force on the piston and a restricted flow of air outwardly through the single air passage with a delay closing of the valve resulting.

2. The valve of claim 1, wherein the air passage has the substantially cylindrical portion and the metering pin has the conical portion positioned in the cylindrical portion.

3. The valve of claim 2, wherein the metering pin also includes a cutaway portion above the conical portion for passage of air through said air passage.

4. The valve of claim 1, wherein the handle is of the push knob type.

5. A self closing type valve for use in a valve housing, the housing having an inlet and an outlet, the self closing type valve comprising:
   a valve body portion having an axial bore, an entrance opening for fluid communication between the housing inlet and the axial bore, and an exit opening for fluid communication between the axial bore and outlet;
   a stem movable in the axial bore;
   means operatively associated with one end of the stem and the valve body opening to effect a closing of the entrance opening;
   a dashpot piston portion having a cylinder head and a piston in the cylinder head wit the stem connected to the piston;
   the dashpot piston portion including a bleed cavity on one side of the piston with a single air passage providing communication into the cavity from outside the cavity, the cylinder head being configured to provide no other communication with the outside except said single air passage;
   a resilient seal member and a screw with an air bore extending therethrough and being air passage positioned in the single air passage to simultaneously and selectively control the rate of air bleeding through the air passage and into the cavity while permitting air to also pass out of the cavity through the air passage when the valve is being closed;
   a handle connected tot he stem at an end opposite the entrance opening and adjacent the screw; and
   biasing means to bias the piston in a direction toward the handle;
   whereby a force effected on the handle in the direction of the entrance opening will cause the valve to open and air to be drawn into the bleed cavity from the air passage and a subsequent release of force on the handle will allow the biasing means to effect a force on the piston and a restricted flow of air outwardly through the single air passage with a delay closing of the valve resulting and the screw can be adjusted by removal of the push handle and without removal of the valve from the valve housing.

6. The valve of claim 5, wherein the resilient seal is in the form of a ring.

7. The valve of claim 6, wherein the resilient seal member is substantially V-shaped in cross section and the screw has a tapering surface for compressing the resilient seal against a tapering seat in the air passage.

8. The valve of claim 5, wherein the biasing means is positioned in a separate chamber which is not in communication with the fluid from the entrance opening.

9. The valve of claim 5, wherein the biasing means is positioned in a separate chamber for location in the valve housing.

10. A compact cartridge type self closing valve for placement in a faucet housing or the like, the housing having an inlet and an outlet, the self closing type valve comprising:
    a valve body portion having an axial bore, an entrance opening for fluid communication between the housing inlet and the axial bore, and an exit opening for fluid communication between the outlet and the axial bore, said valve body portion adapted for attachment to said faucet housing;
    a stem movable int eh axial bore;
    means operatively associated with one end of the stem and the valve body opening to effect a closing of the entrance opening;
    a dashpot piston portion having a cylinder head and a piston in the cylinder head with the stem connected to the piston;
    the dashpot piston portion also including a bleed cavity on one side of the piston with a single air passage providing communication into the cavity from the outside of the cavity, the cylinder head being configured to provide substantially no other communication with the outside air except the single air passage;

an air metering pin being adjustably positioned in the single air passage to simultaneously and selectively restrict the passage of air therethrough, one of the metering pin and the air passage having a conically shaped portion and the other a cylindrical wall portion;

a push handle connected tot he stem at an end opposite the entrance opening and adjacent the air metering pin; and biasing means to bias the piston in a direction toward the handle;

whereby a force effected on the handle in the direction of the entrance opening will cause the valve to open and air to be drawn into the bleed cavity through the single air passage between the cylinder head and the piston, and a subsequent release of force on the handle will allow the biasing means to effect a force on the piston and a restricted flow of air outwardly through the single air passage with a closing of the valve and the air metering pin can be adjusted by removal of the push handle and without removal of the compact cartridge from the faucet housing.

11. The valve of claim 10, wherein the valve body portion has threads for connection to the faucet housing.

12. A compact cartridge type self closing valve for placement in a faucet housing or the like, the housing having an inlet and an outlet, the self closing type valve comprising;

a valve body portion having an axial bore, an entrance opening for fluid communication between the housing inlet and the axial bore, and an exit opening for fluid communication between the outlet and the axial bore, said valve body portion adapted for attachment to said faucet housing;

a stem movable in the axial bore;

means operatively associated with one end of the stem and the valve body opening to effect a closing of the entrance opening;

a dashpot piston portion having a cylinder head and a piston in the cylinder head with the stem connected to the piston;

the dashpot piston portion also including a bleed cavity on one side of the piston with an single air passage providing communication into the cavity from the outside of the cavity, the cylinder head being configured to provide substantially no other communication with the outside air except the single air passage;

a resilient seal member and a screw with an air bore extending therethrough and being adjustably positioned in the single air passage to simultaneously and selectively restrict the passage of air therethrough;

a push handle connected to the stem at an end opposite the entrance opening and adjacent the air metering pin; and biasing means to bias the piston in a direction toward the handle;

whereby a force effected on the handle in the direction of the entrance opening will cause the valve to open and air to be drawn into the bleed cavity through the single air passage between the cylinder head and the piston, and a subsequent release of force on the handle will allow the biasing means to effect a force on the piston and a restricted flow of air outwardly through the single air passage with a closing of the valve and the screw can be adjusted by removal of the push handle and without removal of the compact cartridge form the faucet housing.

13. The valve of claim 12, wherein the valve body portion has threads for connection to the faucet housing.

* * * * *

UNITED STATES PATENT AND TRADEMARK OFFICE
CERTIFICATE OF CORRECTION

PATENT NO.   : 4,973,025
DATED        : November 27, 1990
INVENTOR(S)  : Muhammad Iqbal It is certified that error appears in the above-identified patent and that said Letters Patent is hereby corrected as shown below:

| | |
|---|---|
| Column 5, line 32 | --through the air passage and-- should be inserted before "into" |
| Column 6, line 5 | "wit" should read --with-- |
| Column 6, line 14 | "air passage" should read --adjustably-- |
| Column 6, line 20 | "tot he" should read -- to the-- |
| Column 6, line 57 | "int eh" should read --in the-- |
| Column 7, line 9 | "tot he" should read --to the-- |
| Column 8, line 34 | "form" should read --from-- |

Signed and Sealed this

Twenty-third Day of June, 1992

Attest:

DOUGLAS B. COMER

Attesting Officer     Acting Commissioner of Patents and Trademarks